United States Patent
Anandan et al.

(10) Patent No.: US 10,707,522 B2
(45) Date of Patent: Jul. 7, 2020

(54) METHODS OF MANUFACTURING A SOLID STATE BATTERY

(71) Applicant: Ford Global Technologies, LLC, Dearborn, MI (US)

(72) Inventors: Venkataramani Anandan, Farmington Hills, MI (US); Andrew Robert Drews, Ann Arbor, MI (US); Mohan Karulkar, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 794 days.

(21) Appl. No.: 14/864,042

(22) Filed: Sep. 24, 2015

(65) Prior Publication Data
US 2017/0092981 A1   Mar. 30, 2017

(51) Int. Cl.
| | |
|---|---|
| *H01M 4/04* | (2006.01) |
| *H01M 10/0562* | (2010.01) |
| *H01M 10/0585* | (2010.01) |
| *H01M 4/134* | (2010.01) |
| *H01M 4/1395* | (2010.01) |
| *H01M 4/38* | (2006.01) |
| *H01M 10/052* | (2010.01) |
| *H01M 4/02* | (2006.01) |

(52) U.S. Cl.
CPC ..... *H01M 10/0562* (2013.01); *H01M 4/0402* (2013.01); *H01M 4/0407* (2013.01); *H01M 4/134* (2013.01); *H01M 4/1395* (2013.01); *H01M 4/382* (2013.01); *H01M 10/052* (2013.01); *H01M 10/0585* (2013.01); *H01M 2004/027* (2013.01); *H01M 2300/0071* (2013.01)

(58) Field of Classification Search
CPC ............. H01M 10/562; H01M 4/0402; H01M 4/0407; H01M 4/134; H01M 4/1395; H01M 10/0562
USPC .................................. 29/623.1, 623.4, 623.5
See application file for complete search history.

(56) References Cited

U.S. PATENT DOCUMENTS

| | | | |
|---|---|---|---|
| 3,808,044 A | 4/1974 | Hofmann | |
| 6,103,091 A | 8/2000 | Sekhar et al. | |
| 8,715,525 B2 | 5/2014 | Yamakaji et al. | |
| 2009/0117471 A1 | 5/2009 | Grey et al. | |
| 2009/0202903 A1* | 8/2009 | Chiang | H01M 4/0426 429/203 |
| 2009/0246636 A1* | 10/2009 | Chiang | H01M 2/166 429/231.95 |
| 2013/0122398 A1* | 5/2013 | Birke | H01G 9/025 429/489 |
| 2013/0323604 A1 | 5/2013 | Teshima et al. | |
| 2015/0099190 A1 | 4/2015 | Holme et al. | |

FOREIGN PATENT DOCUMENTS

WO        2014143967 A1    9/2014

* cited by examiner

*Primary Examiner* — Jonathan G Leong
(74) *Attorney, Agent, or Firm* — David B. Kelley; Brooks Kushman P.C.

(57) ABSTRACT

A method of making a solid state battery may include heating a flux sandwiched between a solid ceramic electrolyte and a group one metal. The flux may be heated such that it roughens a surface of the solid ceramic electrolyte and the group one metal melts and adheres to the surface of the solid ceramic electrolyte.

5 Claims, 3 Drawing Sheets

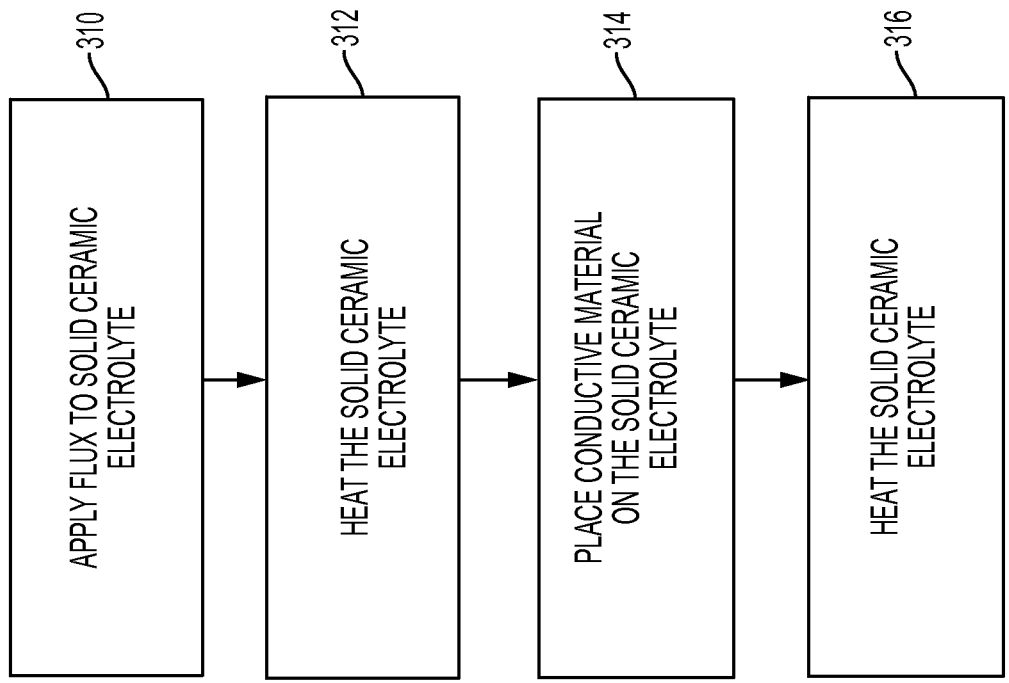
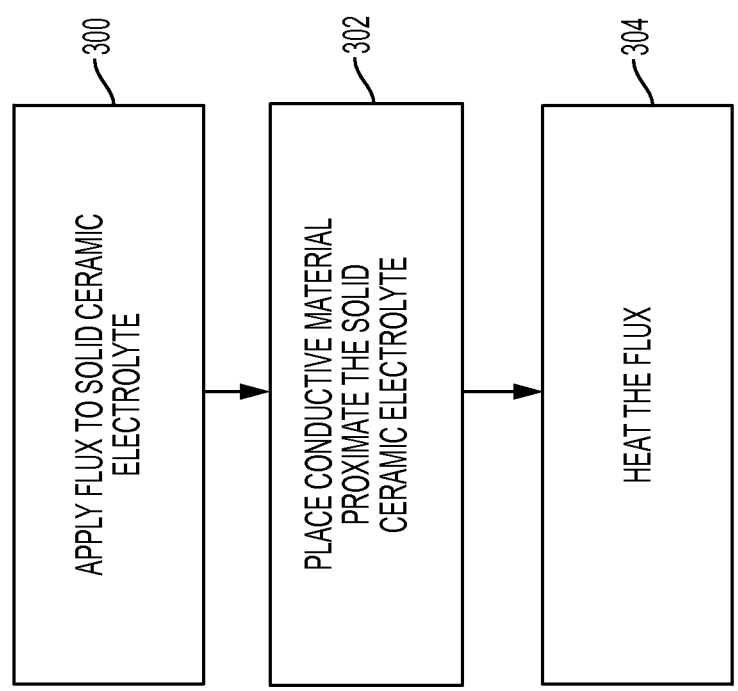
FIG. 3B
FIG. 3A

METHODS OF MANUFACTURING A SOLID STATE BATTERY

TECHNICAL FIELD

The present disclosure relates manufacturing techniques for solid state batteries.

BACKGROUND

Solid-state batteries present a promising alternative to conventional lithium-ion batteries. Typical solid state battery fabrication methods may apply a metal electrode to an inorganic electrolyte through complicated and expensive processes such as physical vapor deposition or e-beam deposition. Other alternative methods may mechanically adhere the metal to an inorganic electrolyte by applying the metal, under pressure, to the inorganic electrolyte. Such fabrication methods are acceptable for thick and freshly roughened inorganic electrolytes but are not acceptable for thin and smooth inorganic electrolytes. In some cases, the metal may delaminate from the inorganic electrolyte or may show high interfacial resistance.

SUMMARY

A method of making a solid state battery includes applying a flux having an activation temperature to a surface of a solid ceramic electrolyte, heating the flux to a temperature above the activation temperature to prepare the surface, placing a metal anode on the prepared surface, and heating the anode such that the anode adheres to the prepared surface.

A method of making a solid state battery includes applying a flux to a surface of a solid ceramic electrolyte or a surface of a metal electrode, arranging the electrolyte and electrode proximate to each other such that the flux is disposed between the electrolyte and electrode, and applying heat such that the flux prepares the surface of the electrolyte and the electrode adheres to the surface of the electrolyte.

A method of making a solid state battery includes applying a flux to a surface of a solid ceramic electrolyte, heating the flux to a temperature above an activation temperature to prepare the surface, and applying molten metal anode material to the prepared surface.

BRIEF DESCRIPTION OF THE DRAWINGS

FIGS. 3A and 3B are flowcharts depicting methods of making a solid state battery.

DETAILED DESCRIPTION

Figure 1:
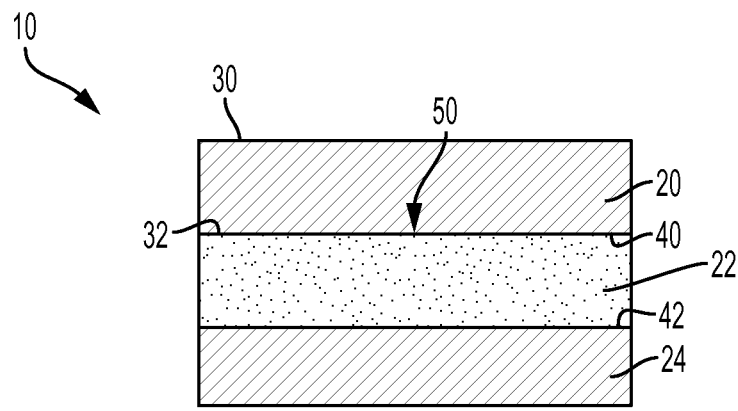
FIG. 1 is a cross-sectional view of a solid state battery.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In certain examples described herein, low cost processes to adhere lithium metal onto a solid electrolyte separator with low interfacial resistance and excellent adhesion using a chemical flux to effectively treat the ceramic solid electrolyte surface prior to melting the lithium metal onto it are proposed. The purpose of the treatment is to clean the surface of both the ceramic and the lithium metal to prevent formation of high-resistance compounds at the interface, and to enhance the wettability of the molten lithium on the ceramic surface.

Several methods for joining metals to ceramics are known and usually include multiple steps for preparing the surface of the ceramic, applying a filler metal layer, and bonding the filler metal to the desired metal component. In some cases, the bonding mechanism involves infiltration of the filler metal, and in other cases reactions at the surface form strong, stable compounds that join the two components. The most common applications of ceramic-to-metal bonding use high temperature conditions (greater than 800° C.). For a solid state battery (SSB) using lithium metal as an electrode, these approaches cannot be employed for at least two reasons: 1) the lithium metal needs to be in intimate contact with the electrolyte surface, so use of a filler metal is not suitable; and, 2) lithium melts at 180° C., so a high temperature method is not needed or desirable.

As mentioned above, directly melting lithium metal onto a surface of ceramic electrolyte may not produce a low resistance interface due to poor wetting and possibly due to formation of undesirable compounds. This issue, however, may be addressed though the use of an acidic flux. Fluxes are commonly used in soldering metals, where the flux dissolves surface oxides that would prevent wetting and adhesion. Additionally, fluxes typically have a low melting point unreactive component which is used to transport the solubilized oxides away from the metal-metal interface and to protect the cleaned metal surfaces from re-oxidation during the soldering operation. Here, the metal component (lithium) is highly reactive and the surface of a ceramic electrolyte may have species that will preferentially react with lithium, such as OH— groups, leading to LiOH or through reaction with $CO_2$ in the air to form $Li_2CO_3$, which are non-conducting solid materials. The presence of lithium carbonate or LiOH (or other surface contaminant layers) will prevent intimate contact between the lithium metal and the electrolyte surface and give rise to high interfacial resistance. Alternatively, an acidic flux that reacts with the surface contaminants might be used to effectively clean the surface and allow molten lithium being applied (e.g., sprayed, made to come into contact with the surface by passing the surface over the molten lithium, etc.) to make intimate contact with the ceramic electrolyte surface.

As an example, a rosin-based zinc chloride flux as a chemical agent was used to pretreat the surface and improve lithium metal bonding to a lithium lanthanum zirconium oxide (LLZO) solid electrolyte. First, the flux was applied to the surface of an LLZO pellet and heated on a hot plate to 200° C. for one minute under argon atmosphere. Then a lithium metal disk was placed on top of the treated surface while still at 200° C. For comparison, lithium metal was also adhered to LLZO samples without the chemical pretreatment.

Referring to FIG. 1, an example SSB cell 10 is shown. The cell 10 may be provided as a component of a vehicle powertrain, and include a metal electrode 20 (anode), a solid ceramic electrolyte 22, and a cathode 24. The solid ceramic electrolyte 22 is sandwiched between the anode 20 and cathode 24.

The metal electrode 20 may be made of a metal or metal alloy of lithium, sodium, magnesium, aluminum etc. For example, the metal electrode 20 may be made of lithium metal or a lithium metal alloy. The metal electrode 20 may have first and second metal electrode surfaces 30, 32 opposite each other. The second metal electrode surface 32 may be disposed proximate the solid ceramic electrolyte 22.

The solid ceramic electrolyte 22 may be made of an oxide-based electrolyte such as lithium lanthanum zirconium oxide (LLZO), lithium phosporhus oxynitride (LiPON), LATP, LiSICON, or the like. The solid ceramic electrolyte 22 may be made of a sulfide based electrolyte such as $Li_{10}GeP_2S_{12}$, $U_2S$—$P_2S_5$, or the like for $Li^+$ conduction, a clay and β-alumina group of compounds ($NaAl_{11}O_{17}$) for $Na^+$ conduction and other mono- and divalent ions. The solid ceramic electrolyte 22 may be thin, having a thickness of less than approximately 50 μm. In one example, the solid ceramic electrolyte 22 may have a thickness of approximately 5 to 25 μm and have a smooth surface finish.

The solid ceramic electrolyte 22 may have first and second solid ceramic electrolyte surfaces 40, 42 opposite each other. The first solid ceramic electrolyte surface 40 may abut against or engage the second metal electrode surface 32. The second solid ceramic electrolyte surface 42 may abut against or engage the cathode 24.

The cathode 24 may be made of transition metal oxides such as lithium iron phosphate, lithium cobalt oxide, lithium nickel cobalt oxide, or lithium manganese oxide. In some cases, the cathode 24 may also be made of sulfur material along with electronic and ionic conducting materials. The cathode 24 can be liquid or semiliquid, which can also be either in static or flow condition.

As mentioned above, traditional adhesion methods to adhere a metal to a ceramic may involve complicated processes. A traditional adhesion process may include mechanically preparing a surface of the ceramic by scoring or the like, applying a filler metal layer to the mechanically prepared surface of the ceramic, applying the metal to the filler metal layer, and heating the combination. The filler metal layer may completely separate the metal from the ceramic. The heating may occur at high temperatures (those exceeding 800° C.). And, the heating may initiate bonding by the infiltration of the filler material into the ceramic. Although this bonding mechanism may be appropriate for cases where a mechanically strong joint is needed, in many applications using it to join a metal electrode to a solid ceramic electrolyte may cause reactions at the surface of the solid ceramic electrolyte that form compounds that may not be ionically conductive and thus contribute to high resistance to the ionic transport between the anode and solid ceramic electrolyte.

The traditional adhesion method is often acceptable to adhere metals that have high melting point (greater than 600° C.) to a thick solid ceramic having a thickness greater than 25 μm, and a mechanically roughened surface. Unfortunately, the traditional adhesion method may not be acceptable to adhere a group one metal or a group one metal alloy to a smooth surface of a solid ceramic electrolyte. Additionally, should the metal electrode 20 be made of lithium metal or a lithium metal alloy having a melting point temperature of approximately 180° C., a high temperature heating may negatively impact the adherence of the metal electrode 20 to the solid ceramic electrolyte 22 through more rapid formation of undesired surface compounds. In an effort to promote intimate contact between the metal electrode 20 and solid ceramic electrolyte 22, the filler metal layer may be removed. However, merely removing the filler metal layer and directly melting the metal electrode 20 to a surface of the solid ceramic electrolyte 22 may present other issues that may reduce the performance of the SSB.

Figure 2A:
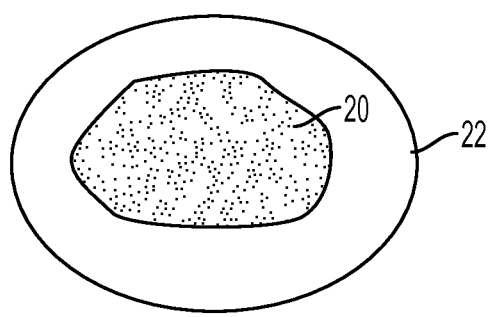
FIGS. 2A and 2B are perspective views of a group one metal adhered to a solid ceramic electrolyte without a flux and with a flux, respectively.

Referring to FIG. 2A, directly melting the metal electrode 20 to a surface of the solid ceramic electrolyte 22 may exhibit poor surface wetting. The possible formation of undesirable reactive compounds may inhibit the further wetting of the first solid ceramic electrolyte surface 40. Additionally, the possible formation of undesirable reactive or non-conducting compounds between the electrode 20 and solid ceramic electrolyte 22 may produce an interface having high interfacial resistance.

A flux may be applied to a surface of the solid ceramic electrolyte 22 to improve surface wetting of the solid ceramic electrolyte 22 and ultimately reduce interfacial resistance. The flux may be applied as a film, coating, paste, powder, or spray to a surface of the solid ceramic electrolyte 22. The flux may be applied by dipping, brushing, or spraying.

Figure 2B:
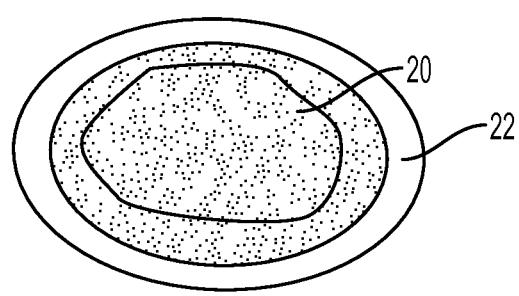

As shown in FIG. 2B, the flux may inhibit the formation of the undesirable reactive compounds such that the metal electrode 20 may better distribute over or wet the first solid ceramic electrolyte surface 40. In addition, the flux may dissolve undesirable compounds such as lithium carbonate or lithium hydroxide, which are already present on the ceramic surface. Additionally, the flux may dissolve or inhibit the formation of undesirable reactive or non-conducting compounds between the conductive material 20 and solid ceramic electrolyte 22 to reduce the interfacial resistance; may dissolve surface oxides that may inhibit surface wetting and adhesion of the metal electrode 20 to the solid ceramic electrolyte 22; and may transport the solubilized oxides or contaminants away from an interface between the conductive material 20 and solid ceramic electrolyte 22.

The flux 50 may include an acidic activator in a non-reactive substance, usually termed the "vehicle." The vehicle may be either an aqueous or non-aqueous substance. An example of a non-aqueous vehicle includes rosin. The activator may be acidic at room temperature or may become acidic above an activation temperature. Above its activation temperature, the flux 50 may reach a pH within a range of approximately 3 to 6.5. The flux 50 may include a mixture of activators, such as abietic acid or pimaric acid and the vehicle may also be acidic. An example of a non-acidic vehicle is petroleum jelly. The activator may be a zinc chloride flux that may pretreat a surface of the solid ceramic electrolyte 22 and improve adhesion of the metal electrode 20 to the solid ceramic electrolyte 22.

The flux may contain an activator compound that reacts above an activation temperature wherein the flux 50 may activate to improve surface wetting of the solid ceramic electrolyte 22. The activation temperature of the flux 50 may be less than a melting point temperature of the metal electrode 20. For example, the activation temperature of the flux 50 may be approximately 180° C. while the melting point temperature of the metal electrode 20 may be approximately 200° C. The activation temperature of the flux 50 may be less than the temperature used to adhere the metal electrode 20 to the solid electrolyte 22 such that no pressure may need to be applied to the metal electrode 20 and/or the solid ceramic electrolyte 22 sandwich to remove any air pockets or to squeeze out any residual flux disposed between the second electrode surface 32 and the first solid ceramic electrolyte surface 40. The activation and melting temperatures of the flux 50 may be less than the melting point temperature of the metal electrode 20 such that the metal electrode 20 may flow about or on the first solid ceramic electrolyte surface 40 by wetting.

Responsive to heating the flux 50 at least to its activation and melting temperature, the flux 50 may dissolve and transport oxides or other contaminants away from the first solid ceramic electrolyte surface 40. The flux 50 may also roughen the first solid ceramic electrolyte surface 40 upon achieving the activation temperature by chemically etching the first solid ceramic electrolyte surface 40. The surface roughness of the first solid ceramic electrolyte surface 40 may be varied based on the properties of the solid ceramic electrolyte 22, the activation temperature of the flux 50, the composition of the flux 50, and the duration of time that the flux 50 is held at or above the activation temperature. The duration of time that the flux 50 is held at or above the activation temperature may be controlled such that the surface roughness does not exceed a threshold.

The flux 50 may be applied to the first solid ceramic electrolyte surface 40. The flux 50 may be heated above the activation temperature to roughen the first solid ceramic electrolyte surface 40. Or, the solid ceramic electrolyte 22 may be heated to the activation temperature and may be held above the activation temperature for a first time period. In at least one example, the first solid ceramic electrolyte surface 40 may be preheated to a preheat temperature. The preheat temperature may be approximately equal to and above the activation temperature of the flux 50. Upon the first solid ceramic electrolyte surface 40 reaching the preheat temperature, the flux 50 may be applied to the first solid ceramic electrolyte surface 40.

The solid ceramic electrolyte 22 may be heated within an inert atmosphere. The inert atmosphere may be an atmosphere containing, for example, argon gas.

The metal electrode 20 may be applied to the solid ceramic electrolyte 22. The second electrode surface 32 may be placed on the roughened first solid ceramic electrolyte surface 40. The combination of the metal electrode 20 and the solid ceramic electrolyte 22 may be heated within an inert atmosphere. The inert atmosphere may be an atmosphere containing, for example, argon gas. The combination of the electrode 20 and the solid ceramic electrolyte 22 may be heated at least to the activation temperature and may be held above the activation temperature for a second time period. The first time period may be substantially equal to the second time period. The heating of the combination of the metal electrode 20 and solid ceramic electrolyte 22 during the second time period may adhere the metal electrode 20 to the roughened first solid ceramic electrolyte surface 40 to form the SSB.

Multiple heating processes may be employed to heat the metal electrode 20, solid ceramic electrolyte 22, and/or flux 50. For example, the metal electrode 20, the solid ceramic electrolyte 22, and/or flux 50 may be induction heated, electrical resistance heated, or the like within a contained environment such as an oven. Irrespective of the heating process employed, the metal electrode 20 may be directly adhered to the solid ceramic electrolyte 22 without a filler metal layer disposed between the conductive material 20 and solid ceramic electrolyte 22. Additionally, the flux 50 may flow away from the interface between the conductive material 20 and solid ceramic electrolyte 22 during the heating process such that the flux 50 may no longer be present at the interface.

Referring to FIG. 3A, an example method of manufacturing a SSB is shown. At block 300, the flux 50 may be applied to the solid ceramic electrolyte 22. The flux 50 may be applied to the first solid ceramic electrolyte surface 40. In at least one example, the first solid ceramic electrolyte surface 40 may be heated at least to the activation temperature of the flux 50 prior to application of the flux 50.

At block 302, the metal electrode 20 may be placed on the solid ceramic electrolyte 22. The electrode 20 may be placed on the solid ceramic electrolyte 22 such that the second electrode surface 32 may be disposed proximate to the first solid ceramic electrolyte surface 40. The flux 50 may be sandwiched between or disposed between the second conductive material surface 32 and the first solid ceramic electrolyte surface 40.

At block 304, the sandwich structure may be heated to an activation temperature of the flux 50. The flux 50 sandwiched between the electrode 20 and solid ceramic electrolyte 22 may be heated within an inert atmosphere. The heating of the flux 50 may cause the flux 50 to roughen the first solid ceramic electrolyte surface 40 via etching for example. The flux 50 may transport oxides and contaminants (carbonates, hydroxides) away from or off of the first solid ceramic electrolyte surface 40. Additionally, the metal electrode 20 may melt and adhere to the first solid ceramic electrolyte surface 40 without requiring that substantial pressure be applied to the electrode 20 to aid in the flowing or transportation of the flux 50 away from the first solid ceramic electrolyte surface 40 and to aid in the adherence of the conductive material 20 to the first solid ceramic electrolyte surface 40.

Referring to FIG. 3B, another example method of manufacturing a SSB is shown. At block 310, the flux 50 may be applied to the solid ceramic electrolyte 22. The flux 50 may be applied to the first solid ceramic electrolyte surface 40.

At block 312, the solid ceramic electrolyte 22 may be heated to the activation temperature of the flux 50. The heating of the solid ceramic electrolyte 22 to the activation temperature of the flux 50 may activate the flux 50 such that the flux 50 etches the first solid ceramic electrolyte surface 40 and dissolves/removes oxides or contaminants. The solid ceramic electrolyte 22 may be heated to a temperature not to substantially exceed the activation temperature of the flux 50.

At block 314, the metal electrode 20 may be placed on the roughened first solid ceramic electrolyte surface 40. The second electrode surface 32 may directly abut the roughened first solid ceramic electrolyte surface 40.

At block 316, the solid ceramic electrolyte 22 may be heated such that the metal electrode 20 melts and wets the roughened first solid ceramic electrolyte surface 40. The electrode 20 may adhere to the roughened first solid ceramic electrolyte surface 40 to form the anode of the SSB.

Figure 4A:
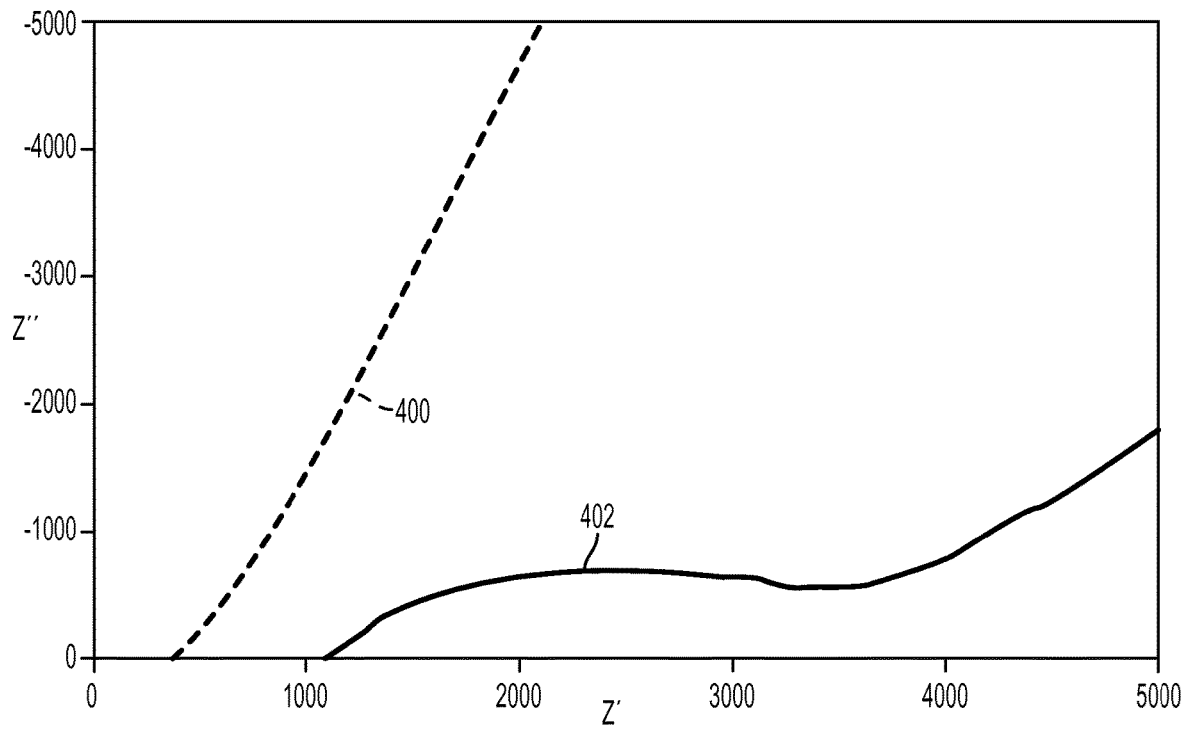
FIGS. 4A and 4B are impedance plots of the solid ceramic electrolyte and the combination of the group one metal and the solid ceramic electrolyte without and with a rosin-based flux, respectively.
Figure 4B:
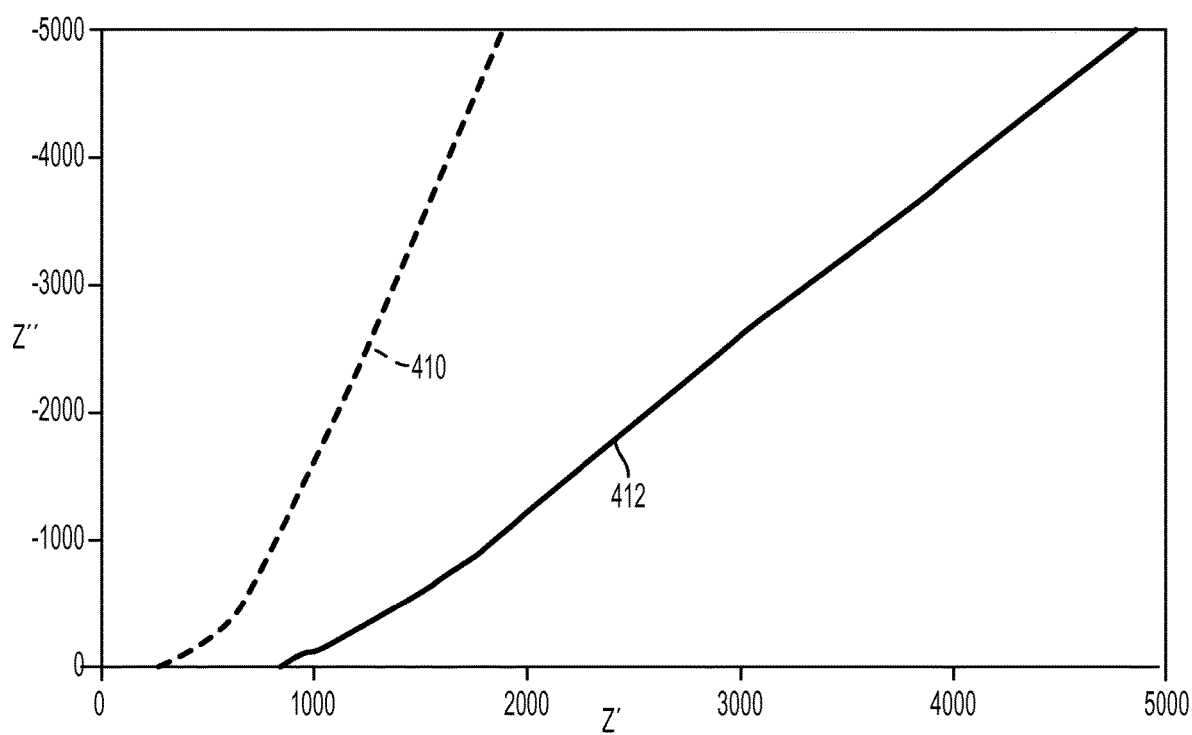

Referring to FIGS. 4A and 4B, Nyquist plots of example impedance results are shown for a metal electrode, such as lithium metal, adhered to a solid ceramic electrolyte, such as lithium lanthanum zirconium oxide, disposed on a blocking electrode, such as gold, without the application of a flux 50 and with the application of a flux 50, respectively. The impedance measurements were performed in the frequency range from 1 MHz to 1 Hz at a voltage signal of 10 mV.

With respect to FIG. 4A, the dashed line 400 represents a measurement of the impedance spectrum of the solid ceramic electrolyte within the high frequency region. The solid line 402 represents a measurement of the impedance spectrum of the lithium metal electrode adhered directly to the solid ceramic electrolyte without the application of a flux to the solid ceramic electrolyte within the high-frequency region. The solid line 402 includes a "semi-circular" feature between ~1100 ohms and 3500 ohms (as measured on the Z' axis) that indicates a high interfacial resistance between the lithium metal electrode and the solid ceramic electrolyte within the high-frequency region.

With respect to FIG. 4B, the dashed line 410 represents a measurement of the impedance spectrum of the solid ceramic electrolyte within the high frequency region. The solid line 412 represents a measurement of the impedance spectrum of the lithium metal adhered directly to the solid ceramic electrolyte with the application of a flux 50 to the solid ceramic electrolyte within the high-frequency region. The absence of a significant semi-circular feature in the solid line 412 is indicative of a lower interfacial resistance between the lithium metal and the solid ceramic electrolyte within the high-frequency region.

Various embodiments may include associated advantages. For example, the application of a flux may improve the performance of SSBs with solid ceramic electrolytes. The surface pretreatment of solid ceramic electrolytes with flux prior to the application of the conductive material may improve the surface wetting of the solid ceramic electrolyte by the metal electrode and permit the metal electrode to make intimate contact with the solid ceramic electrolyte. The improved surface wetting may reduce the interfacial resistance and inhibit the formation of undesirable or non-conductive compounds. The surface pretreatment with the flux may carry undesirable or nonconductive compounds away from the interface between the conductive material and the solid ceramic electrolyte. And, the surface pretreatment with the flux may protect the interface from re-oxidation during the adhering process of the conductive material to the solid ceramic electrolyte.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of making a solid state battery including a solid ceramic electrolyte and metal electrode, comprising:
    applying an acidic chemical flux to the electrolyte or metal electrode;
    arranging the electrolyte and metal electrode proximate to each other such that the flux is disposed between the electrolyte and metal electrode; and
    applying heat such that the flux prepares a surface of the electrolyte and the metal electrode adheres to the surface of the electrolyte.

2. The method of claim 1, wherein an activation temperature of the flux is less than a melting point of the electrode.

3. The method of claim 1, wherein the applying heat is performed within an inert gas environment.

4. The method of claim 1, wherein the flux is non-aqueous.

5. The method of claim 1, wherein the flux is rosin-based.

* * * * *